United States Patent
Khan et al.

(10) Patent No.: US 8,385,326 B2
(45) Date of Patent: Feb. 26, 2013

(54) HANDLING EARLY MEDIA IN VOIP COMMUNICATION WITH MULTIPLE ENDPOINTS

(75) Inventors: Humayun Mukhtar Khan, Issaquah, WA (US); Rajesh Gunnalan, Sammamish, WA (US); Sai Prasanna Mahathi Mahabhashyam, Andhra Pradesh (IN)

(73) Assignee: Microsoft Corporation, Redmond, WA (US)

( * ) Notice: Subject to any disclaimer, the term of this patent is extended or adjusted under 35 U.S.C. 154(b) by 1094 days.

(21) Appl. No.: 12/344,597

(22) Filed: Dec. 29, 2008

(65) Prior Publication Data

US 2010/0165976 A1 Jul. 1, 2010

(51) Int. Cl.
*H04L 12/64* (2006.01)
*H04L 12/66* (2006.01)

(52) U.S. Cl. .......... 370/352; 370/432; 709/228

(58) Field of Classification Search .......... 370/352, 370/432; 709/227, 228; 379/900
See application file for complete search history.

(56) References Cited

U.S. PATENT DOCUMENTS

| | | | |
|---|---|---|---|
| 7,042,871 B2 | 5/2006 | Gallant et al. | |
| 7,415,284 B2 | 8/2008 | Hoover et al. | |
| 7,886,060 B2 * | 2/2011 | Rosenberg | 709/227 |
| 8,179,791 B2 * | 5/2012 | Der et al. | 370/230 |
| 8,284,761 B2 * | 10/2012 | Freyman et al. | 370/352 |
| 2004/0086102 A1 | 5/2004 | McMurry et al. | |
| 2005/0105511 A1 | 5/2005 | Poikselka | |
| 2007/0058537 A1 | 3/2007 | Belling | |
| 2008/0013524 A1 | 1/2008 | Hwang et al. | |
| 2008/0043720 A1 | 2/2008 | Kucmerowski et al. | |
| 2008/0083010 A1 | 4/2008 | Koehler et al. | |
| 2008/0240375 A1 | 10/2008 | Chen | |
| 2008/0259909 A1 * | 10/2008 | Runeson et al. | 370/352 |
| 2008/0317065 A1 * | 12/2008 | Chen et al. | 370/469 |
| 2009/0285204 A1 * | 11/2009 | Gallant et al. | 370/352 |
| 2009/0304173 A1 * | 12/2009 | Ravishankar et al. | 379/229 |

OTHER PUBLICATIONS

Camarillo, et al., "Early Media and Ringing Tone Generation in the Session Initiation Protocol (SIP)", retrieved at <<http://www.ietf.org/rfc/rfc3960.txt>>, Dec. 2004, p. 1-13.
Rosenberg, J., "Interactive Connectivity Establishment (ICE): A Protocol for Network Address Translator (NAT) Traversal for Offer/Answer Protocols Draft-ietf-mmusic-ice-19", retrieved at <<http://tools.ietf.org/html/draft-ietfmmusic-ice-19>>, Oct. 29, 2007, p. 1-117.
Rosenberg, et al., "An Offer/Answer Model with the Session Description Protocol (SDP)", retrieved at <<http://www.ietf.org/rfc/rfc3264.txt>>, Jun. 2002, p. 1-24.
Rosenberg, "Interactive Connectivity Establishment (ICE): A Protocol for Network Address Translator (NAT) Traversal for Offer/Answer Protocols draft-ietf-mmusic-ice-19", Cisco, Oct. 29, 2007, pp. 1-120.
Camarillo, et al, "Early Media and Ringing Tone Generation in the Session Initiation Protocol (SIP)", Columbia University, Dec. 2004, pp. 1-14.

\* cited by examiner

*Primary Examiner* — Chi Pham
*Assistant Examiner* — Ahmed Elallam
(74) *Attorney, Agent, or Firm* — Hope Baldauff Hartman, LLC (57) ABSTRACT

Technologies for handling early media in VoIP communications with multiple endpoints are provided. A calling device sends an initial VoIP call request to multiple destination devices, or endpoints. The calling device then receives a provisional response from one or more of the destination devices that includes media streaming parameters regarding the destination device. The calling device creates a media context associated with the destination device that contains the media streaming parameters and stores the media context. The calling device uses the media context to establish a media connection with the destination. One of the destination devices returning a provisional response is selected to exchange early media over the media connection established with the destination device.

20 Claims, 6 Drawing Sheets

HANDLING EARLY MEDIA IN VOIP COMMUNICATION WITH MULTIPLE ENDPOINTS

BACKGROUND

Voice over Internet Protocol ("VoIP") is a family of transmission technologies supporting voice and video communications over the Internet or other IP networks. This form of communication has gained wide acceptance, and support for VoIP is available on a variety of devices, such as personal computers, IP telephone sets, wireless personal digital assistants, digital cellular phones, teleconferencing equipment, etc. In addition, VoIP systems normally interface with the public switch telephone network, allowing voice calls to be established between VoIP-enabled devices and traditional telephones and cellular phones.

VoIP systems often provide VoIP-enabled devices with many of the features of traditional telephones and cellular phones. This may include the ringing of multiple devices belonging to a single individual for incoming calls. The management of the VoIP communications and connections, however, can become complex when multiple devices or endpoints are participating in the call.

It is with respect to these considerations and others that the disclosure made herein is presented.

SUMMARY

Technologies are described herein for handling early media in VoIP communications with multiple endpoints. According to aspects described herein, a VoIP-enabled calling device sends an initial VoIP call request to multiple destination devices, or endpoints. The calling device then receives a provisional response from one or more of the destination devices. The provisional response includes media streaming parameters regarding the destination device. Upon receiving the provisional response, the calling device creates a media context associated with the destination device that contains the media streaming parameters and stores the media context. The calling device uses the media context to establish a media connection with the destination device associated with the media context. One of the destination devices returning a provisional response is selected to exchange early media over the media connection established with the destination device.

It should be appreciated that the above-described subject matter may be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for handling early media in a VoIP call with multiple endpoints. Utilizing the technologies described herein, a calling device may negotiate a VoIP call with multiple callee devices, perform connectivity checks, establish media connections, and exchange early media, all before the callee answers the call. Once the callee answers the call, the calling device can utilize the media connections already established with the callee device on which the callee answered to exchange content media (audio and/or video). In this way, communication between the caller and the callee may take place immediately upon the callee answering the call, reducing the chances of a dropped "first hello" often associated with VoIP calls.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and that show, by way of illustration, specific embodiments or examples. Referring now to the drawings, in which like numerals represent like elements through the several figures, aspects of a methodology for handling early media in a VoIP call with multiple endpoints will be presented.

Figure 1:
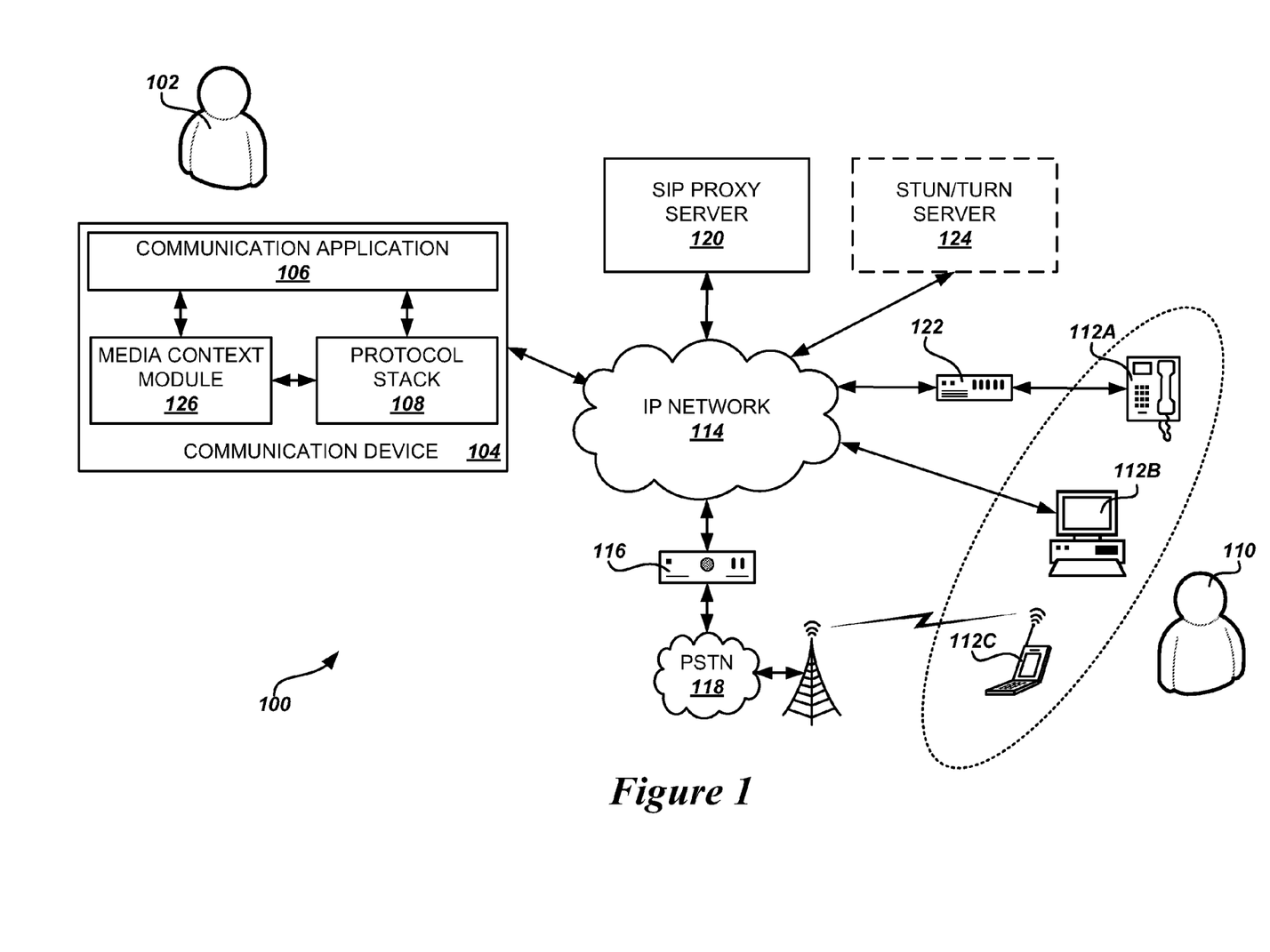
FIG. 1 is a block diagram showing aspects of an illustrative operating environment and several software components provided by the embodiments presented herein.

FIG. 1 shows an illustrative operating environment 100 including several software components for supporting SIP-based VoIP communications between a caller's communication device and multiple callee communication devices, according to embodiments provided herein. As is known in the art, the Session Initiation Protocol ("SIP") is a signaling protocol used by many VoIP devices to perform basic call-control tasks, such as session call setup, tear down, and signaling for features such as call hold, caller ID, conferencing, and call transferring. SIP provides the mechanisms to establish a VoIP call or session between user agents ("UA") located on two or more communication devices, or "endpoints," participating in the call.

The environment 100 illustrated in FIG. 1 includes a caller 102 utilizing a VoIP-enabled communication device 104. The caller's communication device 104 may be a computing device running a communication application 106, such as a server computer executing OFFICE COMMUNICATIONS SERVER 2007 from MICROSOFT CORPORATION of Redmond, Wash., a personal computer ("PC") executing MIZUPHONE from MIZUTECH LTD of Budapest, Hungary, a mobile digital device executing FRING™ from FRING of Ramat Gan, Israel, or other device having similar or equivalent capabilities. The communication application 106 may also be embedded in the firmware or operating system of the caller's communication device 104, such as the firmware of an IP telephone set. It will be appreciated that the caller's communication device 104 may be any VoIP-enabled communication device that uses SIP to establish voice or video calls, as will be described in more detail below.

The caller's communication device 104 includes a protocol stack 108 supporting SIP. The protocol stack 108 provides facilities to allow the communication application 106, acting as the UA on the caller's communication device 104, to establish SIP-based VoIP calls with a callee 110 at one or more of the callee's communication devices 112A-112C over an IP network 114. The IP network 114 may be the Internet or a corporate local area network ("LAN") or wide-area network ("WAN"). The callee's communication devices 112A-112C may include VoIP-enabled devices, such as an IP telephone set 112A or a PC 112B connected directly to the IP network 114, as well as traditional telephone devices, such as a cellular phone 112C.

The callee's communication devices 112A-112C may also execute a program that acts as a UA to participate in the SIP-based VoIP call. A VoIP call between the caller's communication device 104 and a traditional telephone device, such as the callee's cellular phone 112C, may be facilitated through a VoIP gateway 116 that bridges the IP network 114 with the Public Switched Telephone Network ("PSTN") 118. In this case, the VoIP gateway may act as the SIP UA for the traditional telephone device.

The transfer of SIP signaling to setup the VoIP calls often takes place through one or more SIP proxy servers 120 located on the IP network 114. The SIP proxy server 120 acts as an intermediary between the UAs on the endpoints, participating in the call to perform various routing functions, including forking which will be described in more detail below in regard to FIG. 2. The media content (voice and/or video) of the call is exchanged directly between the endpoints participating in a SIP-based VoIP call using different communication channels than the SIP signaling. The exchange of media also utilizes different protocols, such as the Real-time Transport Protocol ("RTP"). The protocol stack 108 may also include support for these protocols to enable the direct exchange of media content between the caller's communication device 104 and the other endpoints participating in the VoIP call.

Some endpoints participating in the VoIP call may be behind firewall and/or network address translator ("NAT") devices, such as the NAT device 122, which have become commonplace on the Internet and within private IP networks. As will be appreciated by one skilled in the art, VoIP calls using SIP signaling are difficult to operate through a NAT device 122, because the information exchanged between the endpoints includes the actual IP addresses and ports of media sources and sinks, which may not be translated by the NAT device.

In order to overcome these difficulties, the user's communication device 104 and other endpoints participating in the VoIP call may implement the Interactive Connectivity Establishment ("ICE") protocol, according to embodiments. The ICE protocol provides a mechanism that allows endpoints participating in a SIP-based VoIP call to successfully traverse firewall and NAT devices 122, using one or more Simple Traversal of UDP through NAT ("STUN") or Traversal Using Relay NAT ("TURN") servers 124 located on the IP network. The ICE protocol is described in the Internet Engineering Task Force ("IETF") Internet Draft entitled "Interactive Connectivity Establishment (ICE): A Protocol for Network Address Translator (NAT) Traversal for Offer/Answer Protocols" (draft-ietf-mmusic-ice-19), which is incorporated by reference herein in its entirety.

According to the ICE protocol, two endpoints may participate in a dialog using SIP signaling to exchange a set of candidate IP addresses and ports for the exchange of media, and then each pair of candidates is tested for connectivity by peer-to-peer connectivity checks. The ICE connectivity checks result in a media connection established on a suitable path for the exchange of media through any firewalls or NAT devices 122 between the candidates. Once a suitable media connection is established, the two endpoints may begin to exchange media using RTP or other protocol.

The endpoints participating in a SIP-based VoIP call may also exchange early media. Early media refers to voice and/or video that is exchanged before a particular VoIP call or session is accepted by the callee 110. Early media may occur from the moment the initial SIP signaling is sent to the called devices until the UA of one of the called devices generates an answer response. It may be unidirectional or bidirectional, and can be generated by the caller's communication device 104, the callee's communication devices 112A-112C, or both. Examples of early media generated by the callee's devices are ringback tones and announcements. Early media generated by the caller's device includes voice commands or dual tone multi-frequency ("DTMF") tones to drive interactive voice response ("IVR") systems.

According to embodiments described herein, the caller's communication device 104 also contains a media context module 126. The media context module 126 provides facilities to the communication application 106 to create and manage media contexts for each endpoint participating in the VoIP call. As will be described below, a VoIP call may be forked by an intervening SIP proxy server 120 to multiple endpoints. The media context module 126 executing on the caller's communication device 104 creates and maintains a media context associated with each of the endpoints, which includes information about the endpoint, such as the parameters for performing ICE connectivity checks and exchanging early media, as will be described in more detail in regard to FIGS. 3-5.

The media context module 126 may also manage the initial exchange of parameters with associated endpoints, the ICE connectivity checks, and the selection of contexts for early media, which will also be described in more detail below. The media context module 126 may be a program extension that executes on the caller's communication device 104, such as a dynamic link library, or it may be implemented as a module in the communication application 106 or protocol stack 108. The media context module 126 may also be a component of the firmware or OS of the communication device 104.

Figure 2:
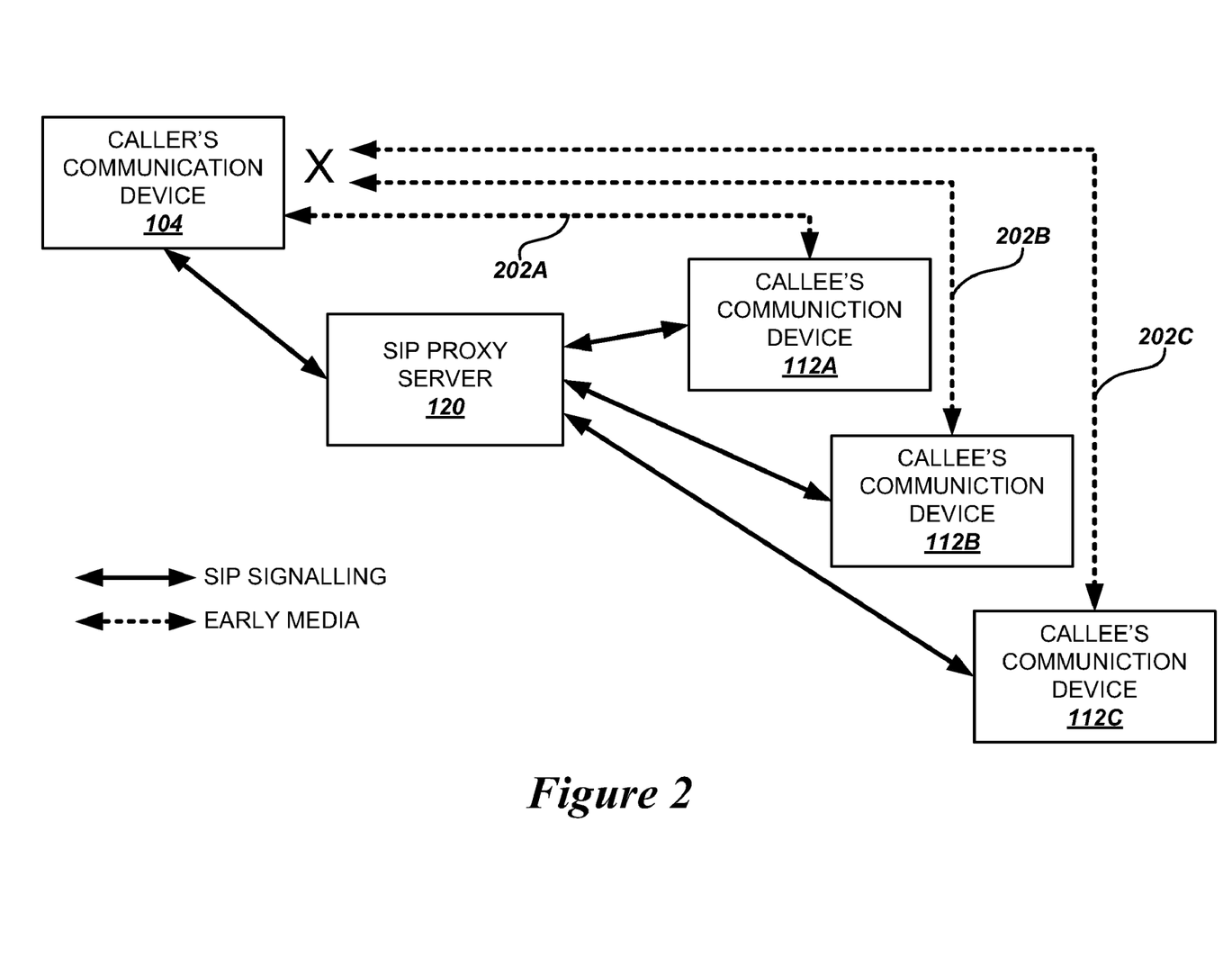
FIG. 2 is a block diagram illustrating further details of the forking of a SIP-based VoIP call to multiple endpoints, according to embodiments presented herein.

As described above, a SIP-based VoIP call initiated by the caller's communication device 104 may be forked to multiple endpoints by an intervening SIP proxy server 120, as illustrated in FIG. 2. This may be the case when a callee 110 has registered multiple communication devices 112A-112C with the SIP proxy server 120 that are to ring when an incoming call arrives. For example, the callee 110 may be logged into their IP phone 112A, personal computer 112B, and cellular phone 112C at the same time. Further, the callee 110 may have previously indicated to the SIP proxy server 120 that all three of these communications devices 112A-112C are to ring upon an incoming SIP-based VoIP call.

When a call originated from the caller's communication device 104 and destined for the callee 110 arrives at the SIP proxy server 120, the SIP proxy server may "fork" the call to all three of the callee's communication devices 112A-112C. The SIP proxy server 120 forwards the initial SIP signaling information from the origin UA on the caller's communication device 104 to the destination UAs on the callee's communication devices 112A-112C. Each of the callee's communication devices 112A-112C then exchange SIP signaling information with the caller's communication device 104.

In addition, the callee's communication devices 112A-112C may initiate ICE connectivity checks to establish respective media connections 202A-202C between the device and the caller's communication device 104. The device may then use the media connection 202A-202C to exchange early media with the caller's communication device 104. As will be described in more detail below in regard to FIGS. 3-5, the media context module 126 handles the ICE connectivity checks with the callee's devices 112A-112C, and selects one of the resulting media connections 202A-202C over which to send and receive early media, according to embodiments described herein. For example, the media context module 126 may allow early media to be sent and received over the media connection 202A established with one of the callee's communication devices 112A, while ignoring the media on the media connections 202B-202C established with the other communication devices 112B-112C, as further illustrated in FIG. 2.

Figure 3:
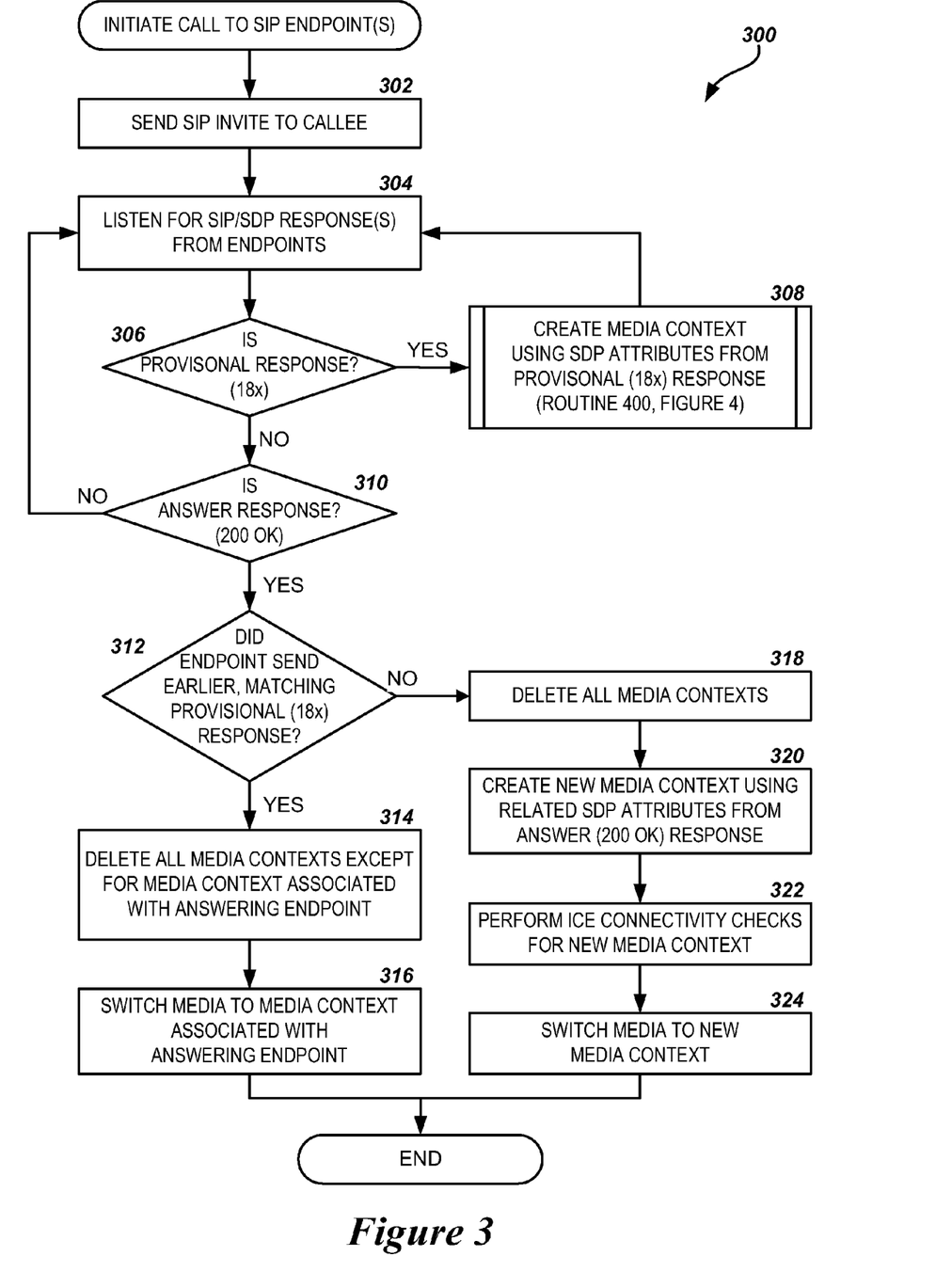
FIG. 3 is a flow diagram showing one method for handling early media during the initiation of a SIP-based VoIP call to multiple endpoints, as provided in the embodiments described herein.
Figure 4:
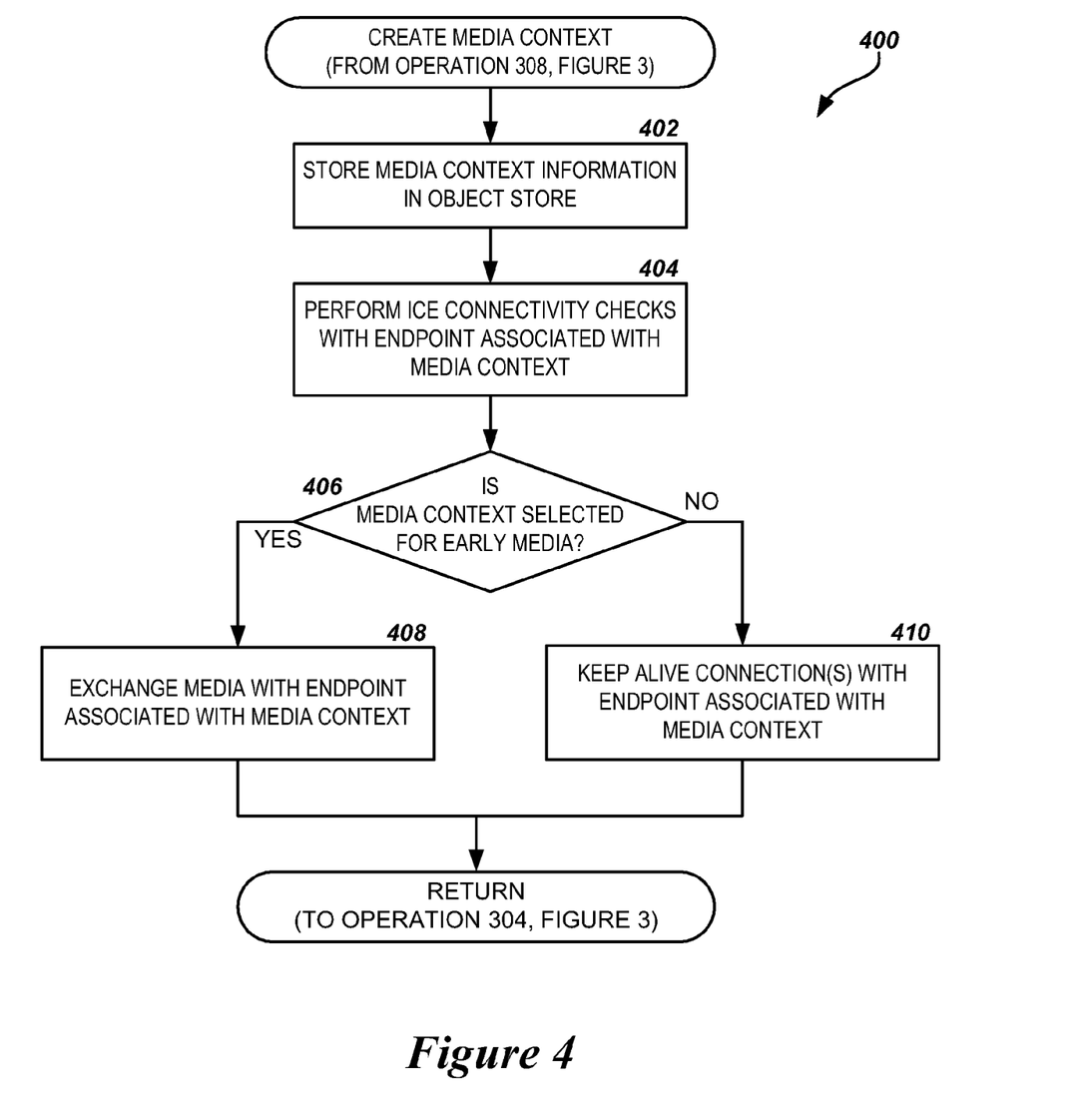
FIG. 4 is a flow diagram showing one method for creating a media context for an endpoint participating in a forked SIP-based call, according to embodiments described herein.
Figure 5:
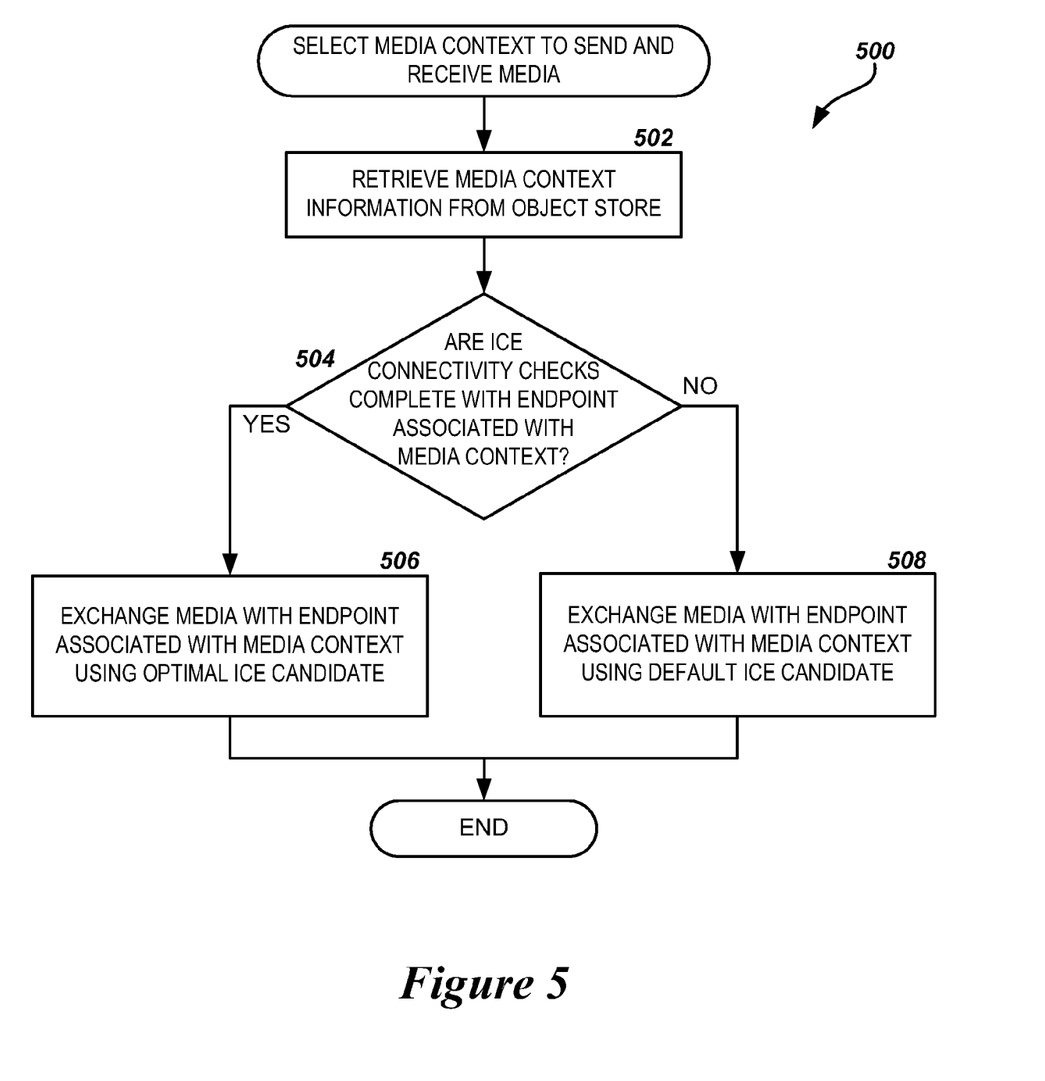
FIG. 5 is a flow diagram showing one method for selecting a particular media context with which to send and receive media, according to embodiments described herein.

Referring now to FIGS. 3-5, additional details will be provided regarding the embodiments presented herein. It should be appreciated that the logical operations described with respect to FIGS. 3-5 are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. The operations may also be performed in a different order than described.

FIG. 3 illustrates a routine 300 for handling early media from multiple endpoints during the initiation of a SIP-based VoIP call, utilizing the media context module 126 described above. The routine 300 begins at operation 302, where the communication application 106 on the caller's communication device 104 sends the initial SIP signaling (the SIP INVITE request) to establish a SIP-based VoIP call with one or more communication devices 112A-112C of the callee 110, also referred to herein as endpoints. The SIP INVITE request is initiated by the communication application 106 through the protocol stack 108, and may be sent to an intervening SIP proxy server 120, which forwards the SIP INVITE request directly to one of the endpoints or a subsequent SIP proxy server, as will be appreciated by one skilled in the art. As described above in regard to FIG. 2, an intervening SIP proxy server may further fork the call to multiple endpoints by forwarding the SIP INVITE request to each endpoint participating in the call, according to embodiments described herein.

The routine 300 proceeds from operation 302 to operation 304, where communication application 106 instructs the media context module 126 to listen for SIP responses from the endpoints participating in the call. Upon receiving a SIP INVITE request, a particular endpoint may initially answer with a provisional response, such as a SIP status code of "180—Ringing" or "183—Session Progress." These "18x" provisional responses indicate that the endpoint has received the SIP INVITE request and is moving forward with establishing the VoIP call.

According to one embodiment, the 18x provisional response includes streaming media initialization parameters that is used for establishing the communication channels to exchange media content between the endpoint and the caller's communication device 104. This information may include, but is not limited to, ICE candidates, ICE agent roles, RTP control protocol ports, encryption keys, supported payload types, packetization times, bandwidth information, and other parameters regarding the endpoint. This information may be conveyed in a format consistent with the Session Description Protocol ("SDP"), which provides the parameters in an ASCII string containing a series of name/value pairs.

If, at operation 306, the media context module 126 determines that a received response is a 18x provisional response, then the routine 300 proceeds to operation 308, where the media context module creates a media context associated with the endpoint using the information provided in the SDP string, as will be discussed in more detail below in regard to FIG. 4. From operation 308, the routine 300 returns to operation 304, where the media context module 126 listens for additional responses to the initial SIP INVITE request from other endpoints.

If, however, at operation 306, the media context module 126 determines that a received response is not a 18x provisional response, then the routine 300 proceeds to operation 310, where the media context module checks the response type to determine if the response indicates a SIP status code of "200 OK." A 200 OK response indicates that the callee 110 has "answered" the call at one of the callee's communication devices 112A-112C and the VoIP call can proceed. This may occur if the callee 110 picks-up the handset on an IP telephone set 112A or pushes a button on a cellular phone 112C. If the media context module 126 determines that the received response is not a 200 OK response, the routine 300 returns to operation 304, where the media context module 126 listens for additional responses to the initial SIP INVITE request from other endpoints. It will be appreciated that media context module 126 may pass responses that are not 18x provisional responses or 200 OK answer responses to the protocol stack 108 or other component to be handled accordingly.

If, at operation 310, the media context module 126 determines that the received response is a 200 OK answer response, then the routine 300 proceeds to operation 312, where the media context module determines if the endpoint that returned the 200 OK answer response ("the answering endpoint") previously responded with a 18x provisional response. If the answering endpoint previously responded with a 18x provisional response, then a media context associated with the endpoint was created in operation 308, as will be described below in regard to FIG. 4.

In one embodiment, the media context module compares the SDP streaming media initialization parameters included in the 200 OK answer response with those contained in the media context associated with the endpoint, in other words, those specified in the previous 18x provisional response. If the parameters match, the routine 300 proceeds from operation 312 to operation 314, where the media context module 126 deletes the media contexts associated with all endpoints except for the answering endpoint. Deleting the media context for an endpoint also has the effect of terminating the connections between the caller's communication device 104 and the endpoint. This would include terminating the ICE connectivity checks for incomplete media contexts or the exchange of early media or "keep-alive" messages for completed media contexts, as will further be described below in regard to FIG. 4.

From operation 314, the routine 300 proceeds to operation 316, where the media context module 126 switches the active media context to the media context associated with the answering endpoint. According to embodiments, the active media context is the media context over which the media content of the VoIP call is actively sent and received by the caller's communication device 104. In one embodiment, if the ICE connectivity checks for the answering endpoint have not completed, then the ICE connectivity checks are allowed to complete before the media context switch takes place. In another embodiment, the media context module 126 utilizes the default ICE candidates for the answering endpoint to establish the media connections for the VoIP call. Once the media context switch is complete, the routine 300 ends and the VoIP call proceeds normally with the media content exchanged between caller's communication devices 104 and the answering endpoint using the media connections 202A-202C of the media context associated with the answering endpoint.

If, at operation 312, the media context module 126 determines that the answering endpoint did not previously respond with a 18x provisional response, or that the SDP streaming media initialization parameters included with the 200 OK answer response do not match those contained in the media context associated with the answering endpoint, then the routine 300 proceeds to operation 318, where the media context module 126 deletes all the media contexts previously created at operation 308. The routine 300 then proceeds to operation 320 where the media context module 126 creates a new media context associated with the answering endpoint using the SDP attributes included in the 200 OK response.

From operation 320, the routine 300 proceeds to operation 322, where the media context module 126 completes the ICE connectivity checks with the answering endpoint, according to one embodiment. Once the ICE connectivity checks are complete, the routine 300 proceeds to operation 324, where the media context module 126 switches the active media context to the new media context created for the answering endpoint, as described above in regard to operation 316. Once the media context switch is complete, the routine 300 ends and the VoIP call proceeds normally with the media content exchanged between caller's communication device 104 and the answering endpoint using the media connections 202A-202C of the new media context associated with the endpoint.

FIG. 4 illustrates a routine 400 for creating and managing a media context associated with an endpoint, according to one embodiment. As described above, the media context module 126 may maintain a media context associated with each endpoint participating in the VoIP call. In addition, the media context module 126 may manage the initial exchange of parameters, the ICE connectivity checks, and selection of a media context for early media. The routine 400 may be invoked by the communication application 106 to create a media context, or it may be invoked internally in response to receiving a 18x provisional response from an endpoint participating in the VoIP call, such as in operation 308 as described above in regard to FIG. 3.

The routine begins at operation 402, where the media context module 126 stores the media context information in an object store. The object store contains all the information regarding the media context created for each endpoint participating in the SIP-based VoIP call that answered with a 18x provisional response. The information regarding each media context includes the SDP streaming media initialization parameters included in the 18x provisional response and information describing the media connections 202A-202C established between the associated endpoint and the caller's communication device 104. The media context module 126 periodically updates the information as the status of the media context changes, from the progression of ICE connectivity checks or the exchange of early media, for example. According to one embodiment, the object store is maintained internally in the media context module 126 and may be accessed by the communication application 106 through an API provided by the media context module 126.

From operation 402, the routine 400 proceeds to operation 404, where the media context module 126 performs the ICE connectivity checks in conjunction with the endpoint associated with the media context. This is accomplished using the ICE protocol described above. It will be appreciated by one skilled in the art that the dialog and connectivity checks described in the ICE protocol may be conducted between the caller's communication device 104 and the endpoint in an asynchronous fashion, and that the media context module 126 may perform the ICE connectivity checks for multiple media contexts concurrently. According to a further embodiment, when a 200 OK answer response is received from any endpoint participating in the VoIP call, the media context module 126 may terminate the ICE connectivity checking for all media contexts associated with non-answering endpoints, regardless of the progress of the connectivity checks.

Once the ICE connectivity checks for the media context are complete, the routine 400 moves from operation 404 to operation 406, where the media context module 126 determines if the media context created has been selected for sending and receiving early media. According to one embodiment, the selection of the media context for early media is performed by the communication application 106 through an API provided by the media context module 126. The communication application 106 may employ any number of methods for selecting the media context for early media, including, but not limited to, choosing the media context associated with the first endpoint to respond with a 18x provisional response, choosing the media context associated with the first endpoint to send early media, or choosing the media context based on some priority of endpoint types, for example, always preferring a cellular phone 112C type device as the source for early media. In another embodiment, the media context module 126 selects the media context for early media, based upon a similar selection methodology.

If, at operation 406, the media context module 126 determines the media context has been selected for early media, the routine 400 proceeds to operation 408, where the media context module causes media to be exchanged with the endpoint associated with the media context. This entails sending and receiving media content over the media connection 202A established between the endpoint and the caller's communication device 104 while ignoring media on media connections 202B-202C established with other endpoints in the call, as described above in regard to FIG. 2. From operation 408, the routine 400 returns to the calling module.

If, however, at operation 406, the media context has not been selected for early media, then the routine 400 proceeds to operation 410, where the media context module 126 keeps the media connection 202A-202C established with the endpoint via the ICE connectivity checks active by sending "keep-alive" messages at a regular interval. According to one embodiment, the keep-alive messages are STUN or TURN "Allocate" and/or "Binding" requests. The media context module 126 will continue to send keep-alive messages on the media connections 202A-202C until the communication application 106 delete the media context, an ICE timeout occurs from the endpoint associated with the media context, or a 200 OK is received from an endpoint participating in the VoIP call. From operation 410, the routine 400 returns to the calling function.

FIG. 5 illustrates a routine 500 for selecting a specific media context for early media, according to a further embodiment. The routine 500 may be invoked by the communication application 106 through an API provided by the media context module 126, or it may be used internally within the media context module to select media contexts for early media. The routine 500 begins at operation 502, where the media context module 126 retrieves the information regarding the specified media context from the object store. As described above in regard to operation 402, the object store contains all the information regarding the media context including the SDP streaming media initialization parameters and the current status information, such as the progress of ICE connectivity checks or the exchange of early media between the associated endpoint and the caller's communication device 104.

From operation 502, the routine 500 proceeds to operation 504, where the media context module 126 determines if the ICE connectivity checks have been completed with the endpoint associated with the media context. If the ICE connectivity checks are complete, then the routine 500 proceeds to operation 506, where the media context module 126 causes media content to be sent and received using the optimal media connections 202A-202C established from the ICE connectivity checks between the associated endpoint and the caller's communication device 104. From operation 506, the routine ends.

If, however, at operation 504, the media context module 126 determines that the ICE connectivity checks have not been completed, then the routine 500 proceeds to operation 508, where the media context module 126 causes media to be exchanged with the associated endpoint using media connections established based on the default ICE candidates for the endpoint and the caller's communication device 104. This allows for a possibility of the exchange of early media before the ICE connectivity checks are complete. Once the ICE connectivity checks between the endpoint associated with the media context and the caller's communication device 104 have been completed, the media context module 126 may then cause early media to be exchanged via the optimal media connections 202A-202C established by the ICE checks. From operation 510, the routine 500 ends.

Figure 6:
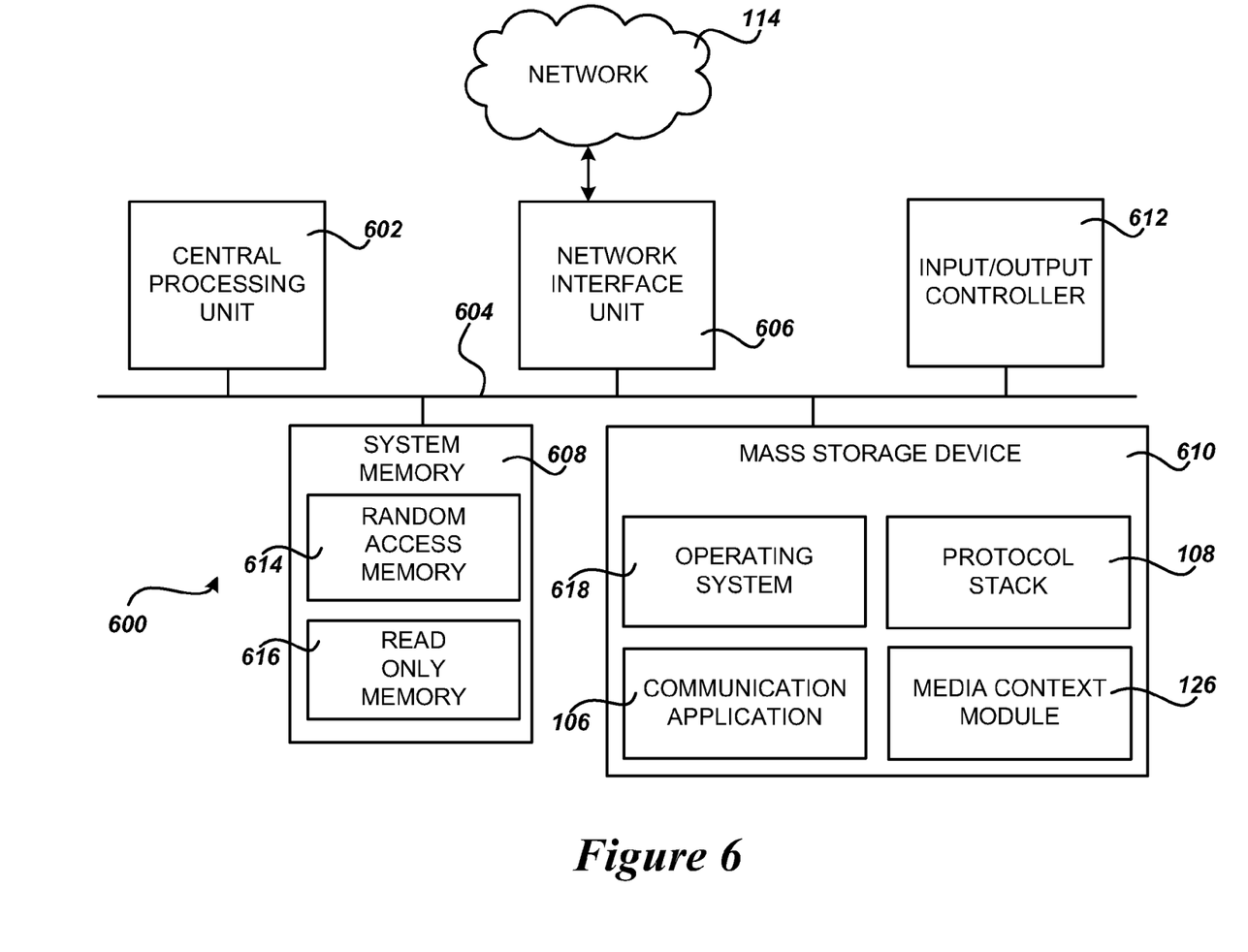
FIG. 6 is a block diagram showing illustrative computer hardware and software architectures for a computing system capable of implementing aspects of the embodiments presented herein.

FIG. 6 shows an example computer architecture for computers 600 capable of executing the software components described herein for handling early media in VoIP communications with multiple endpoints, in the manner presented above. The computer architecture shown in FIG. 6 illustrates a conventional computing device, PDA, cellular phone, communication device, desktop computer, laptop, or server computer and may be utilized to execute any aspects of the software components presented herein described as executing on the caller's communication device 104 or other computing platform.

The computer architecture shown in FIG. 6 includes a central processing unit 602 (CPU), a system memory 608, including a random access memory 614 (RAM) and a read-only memory 616 (ROM), and a system bus 604 that couples the memory to the CPU 602. A basic input/output system containing the basic routines that help to transfer information between elements within the computer 600, such as during startup, is stored in the ROM 616. The computer 600 also includes a mass storage device 610 for storing an operating system 618, application programs, and other program modules, which are described in greater detail herein.

The mass storage device 610 is connected to the CPU 602 through a mass storage controller (not shown) connected to the bus 604. The mass storage device 610 and its associated computer-readable media provide non-volatile storage for the computer 600. Although the description of computer-readable media contained herein refers to a mass storage device, such as a hard disk or CD-ROM drive, it should be appreciated by those skilled in the art that computer-readable media can be any available computer storage media that can be accessed by the computer 600.

By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium that can be used to store the desired information and that can be accessed by the computer 600.

According to various embodiments, the computer 600 may operate in a networked environment using logical connections to remote computers through a network, such as the IP network 114. The computer 600 may connect to the IP network 114 through a network interface unit 606 connected to the bus 604. It should be appreciated that the network interface unit 606 may also be utilized to connect to other types of networks and remote computer systems. The computer 600 may also include an input/output controller 612 for receiving and processing input from a number of other devices, including a microphone, a keyboard, a mouse, or an electronic stylus (not shown in FIG. 6). Similarly, an input/output controller may provide output to a speaker, a display, a printer, or other type of output device (also not shown in FIG. 6).

As mentioned briefly above, a number of program modules and data files may be stored in the mass storage device 610 and RAM 614 of the computer 600, including an operating system 618 suitable for controlling the operation of a computer. The mass storage device 610 and RAM 614 may also store one or more program modules. In particular, the mass storage device 610 and the RAM 614 may store the communication application 106, the protocol stack 108, or the media context module 126, each of which was described in detail above in regard to FIG. 1. The mass storage device 610 and the RAM 614 may also store other types of program modules or data.

Based on the foregoing, it should be appreciated that technologies for handling early media in VoIP communications with multiple endpoints are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for handling early media in a VoIP call with a plurality of destination devices, the method comprising:
   sending an initial call request;
   receiving a response from one or more of the plurality of destination devices, the response indicating a provisional acceptance of the initial call request and comprising media streaming parameters regarding the destination device;
   creating a media context associated with the destination device, the media context comprising the media streaming parameters regarding the destination device;
   storing the media context;
   establishing a media connection with the destination device based upon the media context associated with the destination device; and
   selecting one of the one or more of the plurality of destination devices with which to exchange early media over the media connection established with the destination device.

2. The method of claim 1, wherein the operations of receiving, creating, storing, establishing, and exchanging are repeated for the plurality of destination devices until receiving from one of the plurality of destination devices a response indicating a final acceptance of the initial call request.

3. The method of claim 1, further comprising:
   receiving from one of the plurality of destination devices a response indicating a final acceptance of the initial call request;
   determining if a response indicating a provisional acceptance of the initial call request was previously received from the one of the plurality of destination devices;
   upon determining that a response indicating a provisional acceptance of the initial call request was previously received from the one of the plurality of destination devices, destroying all media contexts except for the media context associated with the one of the plurality of destination devices; and
   exchanging media content of the VoIP call with the one of the plurality of destination devices using the media connection established with the one of the plurality of destination devices based upon the media context associated with the one of the plurality of destination devices.

4. The method of claim 3, wherein destroying all media contexts comprises halting the exchange of candidate addresses and ports and the testing of connectivity with the destination devices associated with the media contexts and closing the media connections established with the destination devices associated with the media contexts.

5. The method of claim 1, wherein establishing a media connection with the destination device based upon the media context associated with the destination device comprises exchanging candidate addresses and ports with the destination device and testing connectivity to the destination device through the candidate addresses and ports utilizing an Interactive Connectivity Establishment ("ICE") protocol.

6. The method of claim 1, wherein exchanging early media with the destination device comprises sending and receiving media over the media connection established with the destination device based upon the media context associated with the destination device while ignoring media received on media connections established with other of the one or more of the plurality of destination devices.

7. The method of claim 1, wherein the VoIP call comprises a SIP-based VoIP call.

8. The method of claim 7, wherein the initial call request comprises a SIP INVITE request and wherein the SIP INVITE request is forwarded to the plurality of destination devices by an intervening SIP proxy server.

9. A system for handling early media in a VoIP call with a plurality of destination devices, the system comprising:
   a communication device;
   a communication application program executing on the communication device and operative to initiate a VoIP call to the plurality of destination devices by sending an initial call request; and
   a media context module executing on the communication device and operative to
      receive a response from a destination device, the response indicating a provisional acceptance of the initial call request and comprising media streaming parameters regarding the destination device,
      create a media context associated with the destination device, the media context comprising the media streaming parameters regarding the destination device,
      store the media context,
      establish a media connection with the destination device based upon the media context associated with the destination device, and
      exchange early media with the destination device over the media connection.

10. The system of claim 9, wherein the media context module is further operative to repeat the operations of receiving, creating, storing, establishing, and exchanging until receiving from one of the plurality of destination devices a response indicating a final acceptance of the initial call request.

11. The system of claim 9, wherein the media context module is further operative to:
   receive from one of the plurality of destination devices a response indicating a final acceptance of the initial call request;
   determine if a response indicating a provisional acceptance of the initial call request was previously received from the one of the plurality of destination devices;
   upon determining that a response indicating a provisional acceptance of the initial call request was previously received from the one of the plurality of destination devices, destroy all media contexts except for the media context associated with the one of the plurality of destination devices; and
   exchanging media content of the VoIP call with the one of the plurality of destination devices using the media connection established with the one of the plurality of destination devices based upon the media context associated with the one of the plurality of destination devices.

12. The system of claim 9, wherein establishing a media connection with the destination device based upon the media context associated with the destination device comprises exchanging candidate addresses and ports with the destination device and testing connectivity to the destination device through the candidate addresses and ports utilizing an Interactive Connectivity Establishment ("ICE") protocol.

13. The system of claim 12, wherein destroying all media contexts comprises halting the exchange of candidate addresses and ports and the testing of connectivity with the destination devices associated with the media contexts and closing the media connections established with the destination devices associated with the media contexts.

14. The system of claim 9, wherein exchanging early media with the destination device comprises sending and receiving media over the media connection established with the destination device based upon the media context associated with the destination device while ignoring media received on media connections established with other of the plurality of destination devices.

15. The system of claim 9, wherein the VoIP call comprises a SIP-based VoIP call.

16. The system of claim 15, wherein the initial call request comprises a SIP INVITE request and wherein the SIP INVITE request is forwarded to the plurality of destination devices by an intervening SIP proxy server.

17. A computer-readable storage medium that is not a signal having computer executable instructions stored thereon that, when executed by a computer, cause the computer to:
send an initial call request for a VoIP call to a plurality of destination devices;
receive a response from a first destination device, the response indicating a provisional acceptance of the initial call request and comprising media streaming parameters regarding the first destination device;
create a first media context associated with the first destination device, the first media context comprising the media streaming parameters regarding the first destination device;
store the first media context;
establish a first media connection with the first destination device based upon the first media context;
receive a response from a second destination device, the response indicating a provisional acceptance of the initial call request and comprising media streaming parameters regarding the second destination device;
create a second media context associated with the second destination device, the second media context comprising the media streaming parameters regarding the second destination device;
store the second media context;
establish a second media connection with the second destination device based upon the second media context;
exchange early media with the second destination device over the second media connection;
receive a response from the second destination device, the response indicating a final acceptance of the initial call request;
destroy the second media context and close the second media connection; and
exchange media content of the VoIP call with the first destination device using the first media connection.

18. The computer-readable storage medium of claim 17, wherein establishing the first media connection with the first destination device based upon the first media context comprises exchanging candidate addresses and ports with the first destination device and testing connectivity between the computer and the first destination device through the candidate addresses and ports utilizing an Interactive Connectivity Establishment ("ICE") protocol.

19. The computer-readable storage medium of claim 17, wherein exchanging early media with the second destination device comprises sending and receiving media over the second media connection established with the second destination device based upon the second media context while ignoring media received on the first media connection established with the first media device.

20. The computer-readable storage medium of claim 17, wherein the VoIP call comprises a SIP-based VoIP call and the initial call request comprises a SIP INVITE request, and wherein the SIP INVITE request is forwarded to the plurality of destination devices by an intervening SIP proxy server.

* * * * *